United States Patent

Coleman

[15] 3,653,834
[45] Apr. 4, 1972

[54] STABILIZATION OF NITRONIUM PERCHLORATE

[72] Inventor: James E. Coleman, Edison Township, Middlesex County, N.J.

[73] Assignee: Esso Research and Engineering Company, Linden, N.J.

[22] Filed: Nov. 24, 1965

[21] Appl. No.: 510,450

[52] U.S. Cl. .................................23/203 R, 23/85, 149/75
[51] Int. Cl. ...........................................C01b 21/52
[58] Field of Search......................23/85, 102, 203 R; 149/75

[56] References Cited

UNITED STATES PATENTS 3,186,790   6/1965   Brown et al..............................23/85 X
3,244,474   6/1960   Schoenfelder et al. ................23/85 X

OTHER PUBLICATIONS

Goddard et al., J. Chem. Soc. (London), 1950, p. 2564 QD1C6

Primary Examiner—Leland A. Sebastian
Attorney—Whelan, Chasan, Litton, Marx and Wright and Henry Berk

[57] ABSTRACT

The method of imparting improved thermal stability to nitronium perchlorate crystals which comprises admixing water molecules in an attenuated form and in a proportion of about 0.1 to 3 weight percent with the crystals, giving the mixture sufficient time for migration of the water molecules and reaction with mixing at below 0° C., then removing reaction degradation products in gaseous state from the nitronium perchlorate reacted with the admixed water molecules under high vacuum down to about 1 to 8 mm. Hg. absolute pressure at room temperature.

6 Claims, No Drawings

STABILIZATION OF NITRONIUM PERCHLORATE

This invention relates to a method for improving the stability of nitronium perchlorate, which is a strong high-energy oxidizer. The stabilization is accomplished by (1) adding a proper amount of water vapor, (2) proper mixing of the water vapor with the nitronium perchlorate crystals and allowing sufficient time for migration and controlled reaction, and (3) removal of volatile reaction degradation products from the treated crystals. This treatment produces a remarkable retardation of the thermal decomposition of nitronium perchlorate and also reduces the predecomposition gassing of this useful oxidizer.

Nitronium perchlorate, which has been called nitroxyl perchlorate and nitryl perchlorate, has been given the formula $$NO_2ClO_4$$

Methods for the preparation of nitronium perchlorate have been known for a long time. Some of the earliest methods for producing the compound called nitronium perchlorate involved the reaction of dry nitric acid with perchloric acid. The product of such a reaction was found to be very unstable and the instability was believed due to the presence of unreacted perchloric acid. Another method for preparing nitronium perchlorate mixed oxides of nitrogen and ozone with dry chlorine dioxide as described by W. E. Gordon et al. in "Canadian Journal of Research", Vol. 18B, pages 358-362 (1940). A more recent method of preparation passes dry chlorine and oxygen through an ozonizer and adds controlled amounts of nitrogen tetroxide.

Using any of the methods for its synthesis, the nitronium perchlorate even of high purity requires care in storage, handling, and use. The high reactivity of this compound with many materials has been a drawback to its wide use. It is a white crystalline solid which has been reported to decompose rapidly at 120° C. and to have a vapor pressure less than 0.05 mm. of Hg at room temperature. It has a density of 2.22 grams per cc. at 25° C. When it contains some impurities, it may tend to decompose extensively at ordinary temperatures. It reacts readily with most organic compounds. Benzene is nitrated to nitrobenzene with explosive violence by nitronium perchlorate. Cyclohexane, acetone and ether react vigorously with it. Alcohol and glycerol react with it rapidly. Nitrobenzene reacts only slowly with it.

Nitronium perchlorate does not react or reacts only slowly with nitrated or highly halogenated compounds. It does not react with nitromethane and is moderately soluble therein and it is slightly soluble in carbon tetrachloride. It has been mixed with polymers such as polyvinylidene chloride and polypropylene.

Hitherto one of the main precautions taken in the handling, use or storage of nitronium perchlorate has been to keep it at a low temperature in the absence of moisture because water or moisture was found to decompose the nitronium perchlorate and the decomposition considered to result in formation of perchloric acid, which has been suspected of being an impurity detrimental to the stability of the nitronium perchlorate. The present invention is based on the surprising discovery that treatment of the nitronium perchlorate with a controlled small amount of water vapor followed by removal of volatile materials that tend to be formed in the treatment improves the stability of the nitronium perchlorate.

The water vapor treatment is carried out effectively with 0.1 to 3 wt. percent $H_2O$, preferably about 0.6 to 2.8 wt. % $H_2O$. The addition of water is best carried out by vapor phase transfer or in a very dilute solution or a mixture with an inert solvent. Thorough mixing of the nitronium perchlorate crystals with the medium carrying the water or water vapor is desirable and the treated nitronium perchlorate is allowed to age for a number of hours to a number of days for allowing sufficient time for the migration and reaction of the water molecules. The preferred period of aging is about 1 to 5 days. This aging process is followed by removal of the volatiles, which may be mostly acids, e.g., nitric acid and perchloric acid, considered to be degradation products, and the removal of these volatiles is preferably carried out within a short period by evacuation with a pump and/or exposure to a dry stream of air or inert gas, e.g., $N_2$, He, A, etc. The time for removal of the volatiles depends on the size of the batch of nitronium perchlorate being treated and the manner of removing the volatiles. It is important that the evacuation be not prolonged, particularly at pressures below 1 mm. Hg absolute. Such high vacuum is applied for less than 1 hour.

The controlling features and factors of the treatments are illustrated in the following examples:

EXAMPLE 1

Standard Treatment

This example is typical of the procedure used in most of the water stabilization experiments. Into a 26 cc. reactor equipped with a Fischer-Porter valve was placed 2.5 grams of nitronium perchlorate in a dry box (<1 p.p.m. $H_2O$). In a similar reactor was placed 0.031 ml of $H_2O$. Both reactors were attached to a vacuum system and the air removed. During this procedure the $H_2O$ bulb was cooled to −196° C. After degassing, the water bulb was warmed to room temperature. The reactor containing the nitronium perchlorate crystals was partially immersed in a −80 C. bath and the valves opened to allow the water vapor of low vapor pressure to enter the reactor containing the crystals. The reactor containing the crystals was shaken with a vibrator to obtain efficient mixing. After the initial mixing, the reactor was alternately warmed to 30° C. and recooled to −80° C. (or −196° C.) to aid the removal of caked crystals from the walls. The reactor was left overnight in a −80° C. bath which slowly warmed to room temperature. The reactor was transferred to the dry box where the treated crystals were loaded into vacuum stability test tubes after 24 hours at room temperature. The samples were subjected to pumping for 5–10 minutes to evacuate volatile reaction products which tend to exert gas phase pressures of 1 to 8 mm. Hg absolute at 28° C., i.e., at room temperature, under equilibrium conditions.

To aid in the mixing and prevent caking, inert solids larger than the crystals, e.g., glass beads, may be admixed with the crystals in the reactor.

The stability of each sample was determined using two different parameters—initial gassing, standard cc of gas liberated per gram of sample in 100 hours at 60° C. and $t_a$, a, the time for the onset of the accelerated decomposition at 60° C. The results are compared with those of untreated nitronium perchlorates below:

| Sample | 60° C. Stability std. cc/g./100 hrs. | $t_a$, hours |
|---|---|---|
| untreated | 0.72, 0.82 | 100 |
| 1.24 wt. % $H_2O$-treated | 0.40, 0.50 | >1100 |

EXAMPLE 2

Mixing Temperature

Same as Example 1 but admixing of water is carried out at 28° C.

| Sample | 60° C. Stability std. cc/g./100 hrs. | $t_a$, hours |
|---|---|---|
| untreated | 0.72, 1.82 | 100 |
| 1.24 wt. % $H_2O$-treated | 0.62 | >690 |

The foregoing data illustrates that cooling to a temperature substantially below 28° C. in the admixing of water molecules is advantageous.

EXAMPLE 3

Effect of Water Level

Same as Example 1 but with varying amounts of water.

| Sample | % C. Stability std. cc/g./100 hrs. | $t_a$, hours |
|---|---|---|
| 2.48 wt. % H₂O-treated | 0.90 | >790 |
| 1.24 wt. % H₂O-treated | 0.40 to 0.58 | >1100 |
| 0.62 wt. % H₂O-treated | 0.58 | >800 |
| .12 wt. % H₂O-treated | 0.92, 0.92 | >250 |
| .06 wt. % H₂O-treated | 1.0, 0.92 | 100, 150 |

These results show that at low treatment levels, ca. 0.06 weight percent, the stabilization is not very effective with the standard treatment using 3 to 5 days for aging. At the high levels, ca. 2.5 weight percent, stabilization is effective against decomposition, but the predecomposition gassing is not as good as at 1.24 weight percent. Furthermore, higher levels about 3 weight percent are not attractive in that they decrease the energy output when used in rocket formulations.

EXAMPLE 4

Effect of Aging

Procedure similar to Example 1 except amount of water and aging time varied.

| Water treatment % | Days Stored | 60° C. Stability std. cc/g./100 hrs. | $t_a$ |
|---|---|---|---|
| 1.24 wt. % | 3 to 5 | 0.40 to 0.58 | >1100 |
| 1.24 wt. % | 39 | 0.34, 0.71 | >650 |
| 0.12 wt. % | 3 to 5 | .92, 1.00 | >250 |
| 0.12 wt. % | 34 | 0.54, 0.60 | 400 |
| 0.08 wt. % | 63 | 0.44 | 650 |
| untreated | — | 0.7 to 0.82 | 100 |

At the treatment level of 1.24 weight percent, increased storage has little effect on stability, but at the lower level, about 0.1 weight percent, increased aging improves the stability and markedly reduces the predecomposition gassing.

EXAMPLE 5

Excessive Evacuation

After the removal of the high volatiles in the water treatment, excessive evacuation is detrimental to the stability of nitronium perchlorate. The treatment of this sample was the same as Example 1 except that after treatment was completed, the sample was subjected to pumping down to less than $10^{-2}$ mm. Hg absolute for 6 hours.

| Sample | Pumping Period | 60° C. Stability std. cc/g./100 hrs. | $t_a$, hours |
|---|---|---|---|
| 1.24 wt. % H₂O-treated | 10 minutes | 0.40 to 0.58 | >1100 |
| 1.24 wt. % H₂O-treated | 6 hours | 1.8, 2.0 | 60 |

EXAMPLE 6

Alternate Methods

An alternate method of improving the stability by water-treatment comprises of using the water-treated nitronium perchlorate as a stabilizer for untreated nitronium perchlorate. Thus mixtures made with 1 part of 1.4 weight percent water-treated nitronium perchlorate and 4 parts of untreated nitronium perchlorate show marked stabilization.

| Sample | cc/g./100 hrs. | $t_a$, hours |
|---|---|---|
| untreated | 0.72, 0.82 | 100 |
| Mixture: ¼ 1.24 wt. % H₂O-treated, ¾ untreated | 0.38 volatile 0.58 | >550 |

As shown by the test data, the stabilization treatment depends upon having a small but sufficient amount of water molecules brought in attenuated or diluted form into contact with the nitronium perchlorate crystals to undergo a combining or complexing reaction and at the same time form a minimum amount of gaseous or volatile degradation products. The volatile reaction products, which exert pressures above 1 mm. Hg absolute in the presence of the stabilized crystals at 28° C., are removed after the desired amount of the reaction has occurred between water molecules and parts of the crystals. If too much water is used in the treatment or the reaction is permitted to be localized, then there is an excessive amount of decomposition without added benefit of stabilizing the nitronium perchlorate. On the other hand, if there is insufficient reaction between the water molecules and parts of the crystals, the amount of stabilization is too low. The reaction is also controlled by carrying out the addition of the water molecules at low temperatures, e.g., below 0° C. The exact reaction of the water with the nitronium perchlorate crystals has been difficult to determine, but there is evidence that the water molecules act on certain parts of the crystals to form what may be considered to be a hydrated compound or hydration products less volatile than the degradation products because in subjecting the water-treated crystals to high vacuum, e.g., less than 1 mm. Hg absolute, an appreciable amount of the hydrated nitronium perchlorate becomes sublimed off and can be collected as a white solid.

The nitronium perchlorate stabilized by the water-treatment in the manner described is useful as a potent inorganic oxygen oxidizer. It may be used with high-energy binders in making propellents.

What is claimed is:

1. The method of imparting improved thermal stability to nitronium perchlorate crystals which comprises admixing water molecules in an attenuated form and in a proportion of about 0.1 to 3 wt. % with the crystals, giving the mixture sufficient time for migration of the water molecules and reaction with mixing at below 0° C. then removing reaction degradation products in gaseous state from the nitronium perchlorate reacted with the admixed water molecules under high vacuum down to about 1 to 8 mm. Hg absolute pressure at room temperature.

2. In the method of claim 1, the water molecules are in attenuated form by being in vapor state for said admixing with the crystals, and the reaction degradation products are removed under vacuum to obtain the stabilized nitronium perchlorate crystals containing hydration products less volatile than said degradation products.

3. In the method of claim 1, said reaction degradation products are materials which exert a gas phase pressure above 1 mm. Hg absolute when in equilibrium at 28° C. with the nitronium perchlorate containing hydration products less volatile than said degradation products.

4. In the method of claim 1, the nitronium perchlorate crystals are cooled on admixing with the water molecules down to temperatures as low as −80° C., the water-treated crystals then are given time for migration of water molecules before removal of degradation products while the crystals are kept cooled to a temperature substantially below 28° C.

5. The method of claim 1, in which stabilized nitronium perchlorate crystals recovered after removal of degradation products are admixed with untreated crystals to impart stabilization thereto.

6. The method of forming stabilized nitronium perchlorate crystals which comprises chilling the crystals to low temperatures of 0° to about −80° C., mixing with the thus chilled crystals water vapor in an amount of 0.1 to 3 weight percent, warming the mixture of the crystals with the admixed water vapor and recooling said mixture to below 0°C., slowly warming the mixture to about 28° C. and evacuating from the mixture volatile reaction products which exert gas pressures of 1 to 8 mm. Hg absolute at 28° C.

* * * * *